INVENTORS
Norman J. Perusse
Wilbur D. Cheever
By their attorneys
Davis, Hoxie, Faithfull & Hapgood

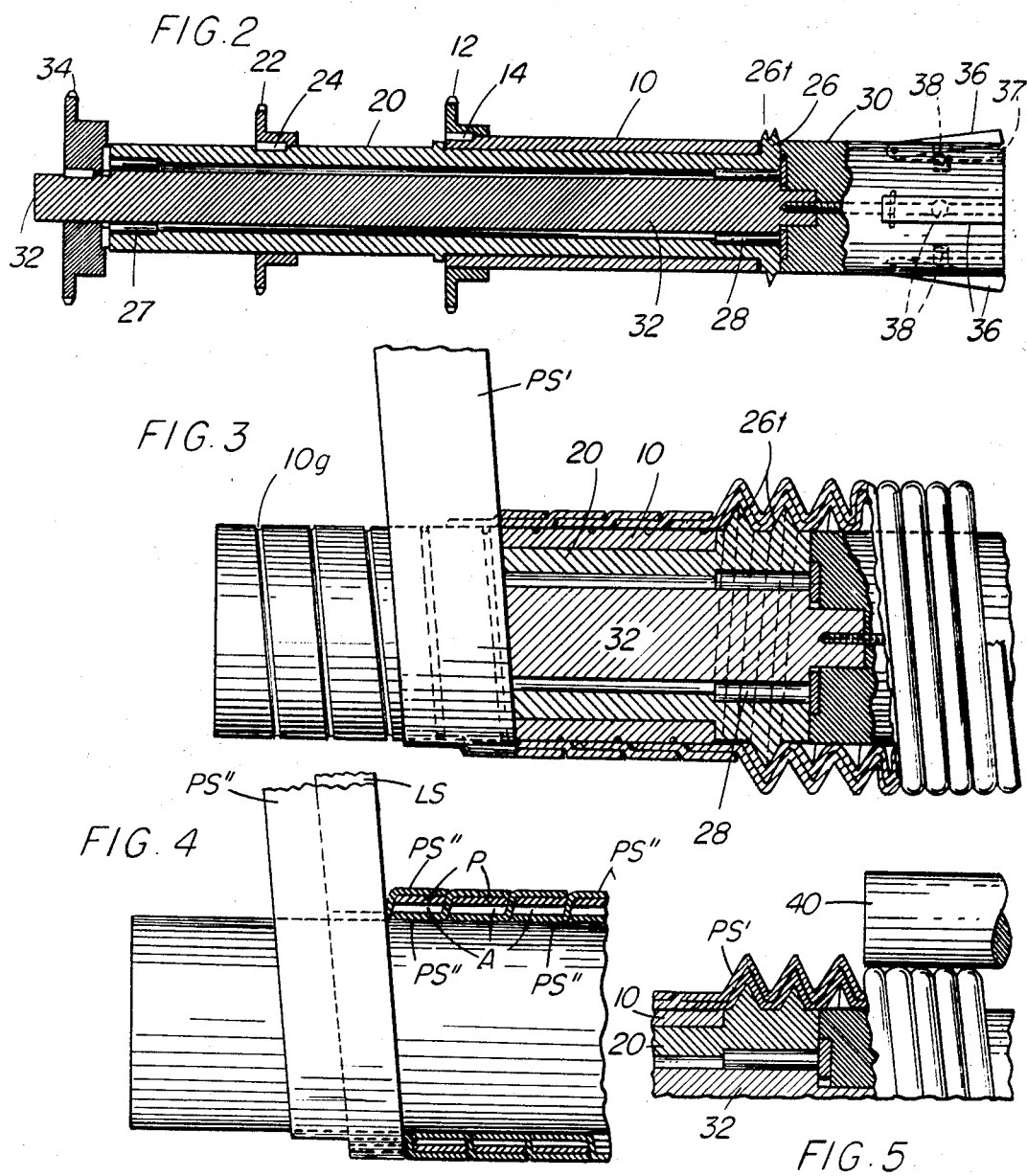

INVENTORS
Norman J. Perusse
Wilbur D. Cheever
By their attorneys

United States Patent Office 3,472,132
Patented Oct. 14, 1969

3,472,132
HELICALLY RIBBED TUBING AND METHOD AND
APPARATUS FOR MAKING THE SAME
Norman J. Perusse, Bristol, and Wilbur D. Cheever,
Wethersfield, Conn., assignors to The Wiremold
Company, West Hartford, Conn., a corporation of
Connecticut
Continuation-in-part of application Ser. No. 523,825,
Dec. 16, 1965. This application Aug. 19, 1966, Ser.
No. 573,704
Int. Cl. B31c 1/00
U.S. Cl. 93—80                                    4 Claims

ABSTRACT OF THE DISCLOSURE

Flexible and collapsible tubing is made of a strip or strips of coated single or multi-ply paper or other material capable of maintaining a corrugated helically ridged form. A rotating forming ring or tool acts interiorly on the tubing as it is wound helically on a mandrel so as to press outwardly a corrugation or ridge continuously like a screw thread. The edges of adjacent convolutions of the strip or strips overlap. The formed tubing may be delivered to a compression mandrel upon which the formed ridges are pressed axially closer together.

---

This application is a continuation-in-part of our copending application Ser. No. 523,825, filed Dec. 16, 1965 and entitled "Helically Ribbed Tubing and Method and Apparatus for Making the Same."

This invention relates to helically wound and corrugated tubing. More particularly, the invention relates to tubing formed from a strip or strips of metal foil or synthetic plastic material or fabric or plain, coated impregnated or lined paper, or other flexible materials or combinations thereof which are capable of being pressed and formed into helical corrugations or ridges and grooves and retaining such formation as the tubing is formed and thereafter.

The invention also relates to a method and machine for making such tubing.

Heretofore, flexible and collapsible helically wound tubing made from thin strips has been formed of various materials. Two-element tubing comprised of flexible and metallic strips with the edges of adjacent convolutions interengaged or interlocked has been widely used in conduction of air and other gases. Such tubing, however, is relatively expensive. Thus, a need exists for flexible tubing made of less expensive materials.

Therefore, one object of this invention is to provide improved helically wound flexible and collapsible tubing made of one or more elements or strips of materials as aforesaid and which may be of single ply or multi-ply type and wherein the strips are capable of being pressed and formed into helical corrugations or convoluted ridges and grooves as the tubing is generated.

Another object is to provide a machine for making such tubing continuously from continuous strips of material.

Another object is to provide a novel method for making such tubing.

Another object is to provide such tubing and the means and method for making the same continuously from strip material, with one or more such strips coated or lined with a material or materials so that the resulting tubing is waterproof and impervious to the passage of gases.

Other objects and advantages of the invention will appear as it is described in connection with the accompanying drawings.

In the drawings:

FIG. 2 is a longitudinal section view of the combination of mandrels and forming ring employed in FIG. 1.

FIG. 3 is a fragmentary elevational view, partly in longitudinal section, showing single-element tubing in the several stages of its formation.

FIG. 4 is a fragmentary elevational view, partly in longitudinal section, showing multi-ply tubing in the process of its formation, with the helical forming and compression stages (which are shown in FIG. 3) broken away.

FIG. 5 is a fragmentary detail view showing partly in section and partly in elevation the forming and compression stages and the pressure wheel.

FIGS. 6–11 are diagrammatic sectional views through one-half of variations of tubing showing six different tube wall structures, before the helical convolutions are formed.

Figure 1:
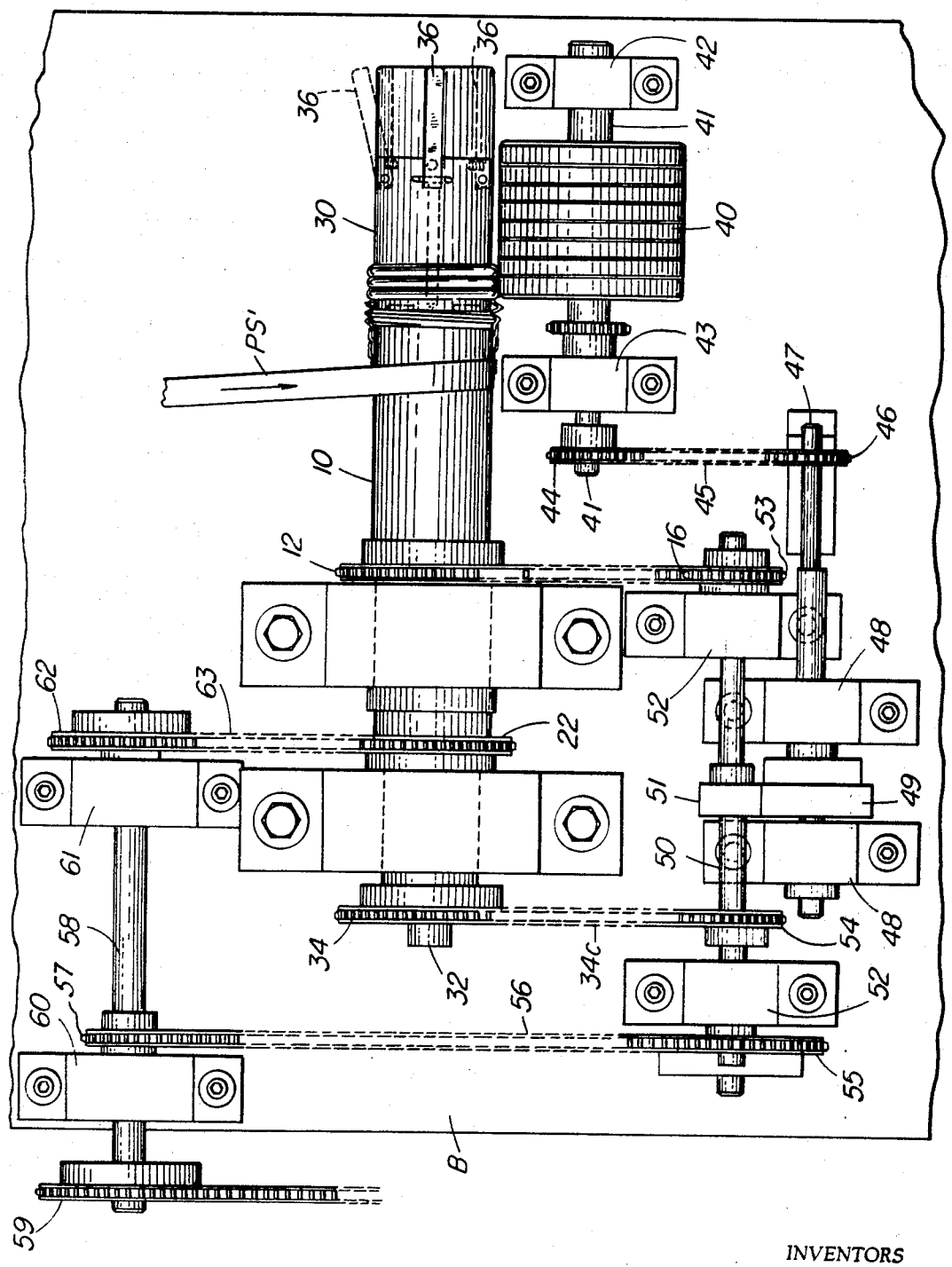
FIG. 1 is a plan view of a machine embodying the invention.

Before describing with reference to the drawings the mechanism for driving the various forming implements and tools which act on the materials to form the tubing, we will describe the assembly, the functions and the cooperation of the tube forming implements and tools in connection with the feeding to the assembly of the raw materials, i.e. the strip or strips of single-ply or laminated material.

Referring to FIGS. 2 and 3 and viewing the invention broadly, a strip or strips of the material or materials to be formed into tubing go through three stages. As is hereinafter described, the strip material is drawn through these stages by the frictional drag of a forming ring 26 which works upon the strip material. The progress of the strip through the machine may also be assisted by a compression mandrel 30 around which the strips are wrapped when formed into tubing, as is hereinafter described. Inclusion of a compression mandrel in the machine is preferable, but it need not always be present. In either event, it is believed that the main force acting to draw the strip along is exerted by the forming ring.

Prior to reaching the compression mandrel, the strip material is acted upon by the forming ring 26 which may have single or multiple threads on its periphery.

The strip material reaches the forming ring by winding helically around a guide mandrel 10.

As will be more fully described hereinafter, the guide mandrel 10 may be stationary or may rotate. The forming ring 26 may rotate in either direction, but it should not remain stationary because only one thread or convoluted rib would be generated for each convolution of the strip, giving as a result tubing of no presently known value. But, in all circumstances of operation, the compression mandrel 30 will rotate. It may rotate freely, or be rotated under power in a certain selected direction, which may be clockwise or anti-clockwise. However, the direction selected for its rotation will affect the formation and operation of the forming ring and guide mandrel as will hereinafter more fully appear.

Referring to FIG. 2, the guide mandrel 10 is hollow and cylindrical with a smooth continuous cylindrical surface and is rotatably mounted on one end of a hollow shaft 20. Mandrel 10 may be rotated by a sprocket 12 keyed to the mandrel by key 14 or the mandrel may remain stationary. It has been found that in most instances it is better for mandrel 10 to be stationary. In such instances, the mandrel preferably will have a narrow shallow helical groove 10g of semi-circular cross section to help guide the strip material passing over it in order to maintain the lead desired on the strip.

The hollow shaft 20 may be rotated by a sprocket 22 to which it is keyed by key 24. The sprocket 22 is located between the mandrel-driving sprocket 12 and one end of hollow shaft 20, while on the opposite end of that shaft is the forming ring. The forming ring is a narrow annular ring 26 which is unitary with hollow shaft 20. The forming ring may be rotated in either direction as hereinafter described. The forming ring has its periphery machined to form a helical thread or ridge 26t. This ridge may be a single thread. To facilitate the starting and forming of the thread-like helical ridge and groove contour of the tubing, the thread ridge 26 of the forming ring tapers from the root, diameter of the forming ring to a maximum at the outgoing end. Alternatively, two or more such ridges may be formed as a multiple thread, tapering as just stated.

When a single lead thread is used on the forming ring, that thread is usually made to total somewhat more than one complete turn of the forming ring in length. When multiple threads are used, their total combined length is still only somewhat more than one complete turn of the forming ring because one thread must end before the next one begins to rise much above the surface of the guide mandrel.

The forming ring is provided so that when a strip of paper PS' or other material is fed to and wound around the mandrel 10, helically, and up to and around the forming ring 26, the forming ring creates exteriorly extending helical convolutions in the paper strip PS'.

In order that the helical ridge or thread shall cause formation of multiple helical convolutions in each convolution of the strip, like unto formation of an internal thread, there must be a difference in the peripheral speed of the forming ring thread with respect to the speed of the strip material. As above indicated, forming ring 26 may turn in the same direction as the compression mandrel 30 or oppositely.

When the forming ring turns in the same direction, but faster than the compression mandrel, the peripheral speed of the forming ring will be greater than the peripheral speed of the compression mandrel and, thus, of the linear speer of the strip. Under such conditions, the lead of the thread on the forming ring should be opposite to the lead of the strip material.

In aid of understanding what happens under the conditions mentioned, one may draw a comparison with a screw turning within a nut. If the screw turns and the nut does not, the turning of a right-hand-threaded screw will move the nut from left to right, i.e. forward. This movement will be at the ratio of one thread pitch for each turn of the screw. Alternatively, if the nut is caused to turn in the same direction as the screw, but the screw turns twice as fast, the nut will tend to move from right to left, i.e. backward one thread pitch for each revolution of the nut. However, during the same time the screw will have turned two revolutions and have tended to move the nut forward twice the thread pitch. The net result is a movement of the nut forward only one thread pitch.

Now, if the nut were of compressible material and the screw had but one thread convolution, and if anything retarded the forward movement of the nut, then the single convolution of the screw thread would tend to push each nut thread forwardly towards its neighbor, successively, as the screw thread acted on the nut threads in succession. In that way, the nut threads would be compressed.

In like manner, when the forming ring turns in the same direction, but faster than the compression mandrel (which is to say faster than the strip is permitted to move axially by the compression mandrel), the convolutions, as they are formed in the strip, cannot move axially fast enough. The result is that the convolutions are pressed together as the tubing is formed.

Considering next the alternatives when the forming ring: (1) turns in the same direction, but slower than the compression mandrel, or (2) turns opposite to the compression mandrel, the lead of the forming ring will be in the same direction as the lead of the strip material.

Recapitulating and summarizing, the lead of the threads on the forming ring will be opposite the lead of the strip material only when the forming ring turns faster than and in the same direction as the compression mandrel. This is the preferred condition.

Considering now the relation of the speed of the guide mandrel 10 and of the forming ring 26, when the forming ring 26 rotates faster than the mandrel 10, the tube around the guide mandrel is drawn axially along it by the action of the forming ring on the tube, and the convolutions formed by the ring will then be closely spaced as they are formed and will be compressed as they move along the compression mandrel.

From the foregoing, it may be understood that a tube is continuously formed from the strip material PS', and the wall of the tube is formed continuously with a continuous thread-like helical ridge and groove contour.

It has been found if the strip is wound left-handed and the thread-like ridge is right-handed, or vice versa, that tighter firmer tubing is generated than if the strip is wound in the same direction as the thread-like ridge.

When single element tubing is made of the particular form illustrated in FIG. 3, a single strip is drawn under tension from a supply and is wound around the mandrel in such a way that in one turn of the strip around the mandrel, the strip travels axially along the mandrel only one-half the width of the strip. Thus, on the second turn around the mandrel, the trailing half of the first convolution of the strip is overlapped by the leading half of the succeeding or next convolution of the strip. This condition continues up to the forming ring around which the overlapped strip is also wrapped. The forming ring creates the helical ribbing and, as previously indicated, causes the formed tubing to move axially. In this way tubing is wound having double thickness walls from only one strip.

The invention is not limited, however, to the just described one-half overlap. The overlap may be more or less as desired.

When a compression mandrel is used to compress the tubing as it leaves the forming ring, the compression mandrel 30 is of approximately the same diameter as the guide mandrel 10 and is located on the opposite side of the forming ring from the guide mandrel 10. The compression mandrel is mounted on a shaft 32 coaxial with and within the hollow shaft 20. Bearings 27, 28 at opposite ends of the hollow shaft 10 and compression mandrel shaft 32 are located between those shafts so as to support and position the hollow shaft 20 and, in turn, the guide mandrel 10.

The compression mandrel shaft 32 extends beyond that end of the hollow shaft 20 which is opposite the compression mandrel; and a sprocket 34 is mounted on said extending end for driving said shaft, the sprocket being driven by a chain 34c as hereinafter more fully described. When mandrel 10 is driven, it is at the same speed and direction as the compression mandrel 30.

In order to hold the helically ribbed tubing on the compression mandrel so as to rotate therewith until the tubing moves off, four radially movable arms 36 (see FIGS. 1 and 2) are pivotally mounted in four equally spaced longitudinal slots 37 formed in the periphery of the compression mandrel adjacent its free end. The arms are pivoted adjacent their inner ends. Coiled compression springs 38 press against the inner surfaces of the arms and are located in wells or bores in the bottom of the slots so as to constantly urge the arms radially outward. These arms tend to retard movement of the tubing off the mandrel and thus to press the convolutions together, axially, before the tubing moves off the compression mandrel.

The arms 36 also enable the machine to be used satisfactorily with different thicknesses of materials, as the arms press outwardly against the tubing and thus accommodate variations in the diameter of tubing made of different materials, or variations during generation of the tubing made of any particular material or materials. The arms thus avoid the need for fine measurement machining of the mandrel and give latitude in that respect.

The peripheral or circumferential speed of the tubing from the start of its formation on the guide mandrel 10 until it leaves the compression mandrel 30 is the same. Since the forming ring rotates at a different speed from the mandrels 10 and 30, there is slippage between the forming ring and the tubing while the helical ribbing is being formed. There is contraction in axial length of the tubing as the ribbing is being formed.

The linear speed of the tubing axially along its course varies.

On the hollow guide mandrel 10, the longitudinal advance of the tubing approximates the lead on the forming ring times the revolutions per minute of the forming ring, minus or plus one (1), depending on whether the strip lead is in the same direction or opposite the direction of rotation of the forming ring, and depending on how much slippage of the forming ring occurs with respect to the tubing. However, the longitudinal advance of the formed tubing along the compression mandrel is less. Here the convolutions are compressed axially to a lead less than their lead as they were formed originally on the forming ring to an extent which depends on material thickness and other variables.

The compression mandrel is designed to have a minimum circumferential slippage while the finished and compressed tubing is slipping lengthwise. The speed of the forming ring should be such that it passes material equal to one lead of strip material for each turn of the compression mandrel. For example, with a ¼ inch forming ring lead and a 1½ inch lead of the strip material on the guide mandrel, the forming ring should turn about seven or about five times for each turn of the compression mandrel, the one turn of the mandrel being subtracted or added depending on similar or opposite rotational directions of the mandrel and ring.

Thus, as the tubing leaves the compression mandrel, it has helical ribbed convolutions greater in diameter than the original winding diameter and is shortened in length by the axially compressed convolutions.

In order to assist the rotary movement of the convolutions formed by the forming ring, a rubber covered roller 40 is positioned alongside the compression mandrel so that its periphery may be pressed lightly against the surface of the convolutions of the ribbed tubing. The engagement of roller 40 exerts a drag to retard axial movement of the tubing and thus assists in compression of the convolutions of the tubing axially, At the same time, the paper strip PS' is drawn from the supply by the rotation of the roller 40 and compression mandrel 30 and forming ring 26. It has been found, however, that the machine will usually operate satisfactorily without the roller 40 once the generation of the tubing has been started in any way. The peripheral speed of the roller 40 is the same as the peripheral speed of the duct.

The roller 40 is mounted on a shaft 41 rotatably mounted in pillow-box bearings 42, 43 which, in turn, are mounted on the base plate or frame B of the machine.

The roller shaft 41 is driven by a sprocket 44 fixedly mounted on its end and chain 45 trained over it and over another sprocket 46 on the end of an intermediate shaft 47 parallel to and spaced from the axis of roller shaft 41.

Intermediate shaft 47 is journalled in two spaced pillow-box bearings 48, 48 mounted on the base B. Between the bearings 48 and upon shaft 47, a large gear 49 is affixed which meshes with and is driven by a smaller gear 51 affixed to a secondary drive shaft 50 mounted rotatably in two spaced pillow-box bearings 52, 52. The shaft 50 is driven by a sprocket 55 mounted on its end and a chain 56 which is also trained over a sprocket 57. This sprocket is affixed on a primary drive shaft 58 driven by a source of power through a sprocket 59 affixed on one end of the shaft 58. The shaft 58 is journalled in bearings 60, 61 mounted on the base B.

On the opposite end of primary drive shaft 58, a sprocket 62 is mounted which by a chain 63 drives a sprocket 22 mounted on the hollow shaft 20 which drives the forming ring 26. The compression mandrel shaft 32 and the compression mandrel 30 are driven by a chain 34c trained over the sprocket 34 on that shaft and over a sprocket 54 fixedly mounted on secondary drive shaft 50. (The arrangement just described is used when the forming ring is to be rotated in the same direction as the compression mandrel 30. If the forming ring is to be rotated oppositely to the compression mandrel, gearing will be introduced between primary drive shaft 58 and sprocket 22 to rotate sprocket 22 reversely with respect to primary shaft 58.)

When the guide mandrel 10 is to be rotated, it is driven by a chain 16 trained over the sprocket 12 on that mandrel and over a sprocket 53 fixedly mounted on the secondary drive shaft 50.

It will now be apparent that the mandrel 10 and 30 and forming ring 26 are driven from the primary drive shaft 58 through chains and sprockets whose teeth and gearing ratios are selected to give the desired speed of rotation as above indicated.

As previously noted, the guide mandrel 10 need not be power driven, but may remain stationary. The machine may be satisfactorily operated either way. Preferably the guide mandrel 10 is not power driven, but is provided with helical grooves (shown only in FIG. 3) to guide strip material. The grooves are necessary when the mandrel is stationary and the strip material stretches, like paper, or has no body stiffness, like vinyl plastic strips. With metal foil like aluminum, the grooving is useful but not necessary.

It is preferable to rotate the mandrel when using paper strips. Practically, the mandrel is power driven or stationary.

The invention may be used to generate multi-ply tubing as illustrated in FIG. 4. In such case, the machine is constructed and operated as before, but two strips PS" and LS are fed to and wound around the guide mandrel 10.

One strip may be a paper strip PS" of selected width and the other strip may be a laminated strip such as paper P with aluminum A or other metal foil adhered to one side. If (a) the foil side of the laminated strip LS is placed beneath the paper strip PS" facing either inwarding or outwardly, and (b) if the lead of the winding is one-half (½) the width of the strip PS", and (c) if the width of the laminated strip is one-half (½) the width of the strip PS", the foil will be entirely covered both inside and out in the generated tubing. The same would apply if a plain strip of foil were used in lieu of the laminated strip.

Alternatively, referring to FIG. 3, if a laminated strip were used in place of the paper strip PS', the tubing would have a paper exterior and a foil interior.

As another alternative, if two strips of equal instead of unequal width were used in FIG. 4, the inner strip being a laminate with foil outermost, tubing would be generated with an invisible foil lamination with paper on inside and outside surfaces of the tubing.

As shown in FIGS. 6, 7 and 8, tubing may be made of single-ply strip material with only the margin of the leading edge of one convolution overlapping the trailing edge of the preceding convolution (as shown in FIG. 6) to form tubing having single layer wall thickness; or the leading half of the strip of one convolution may overlap the trailing half of the preceding convolution as shown in FIG. 7 to form tubing having double-wall thickness or the leading one-third of the strip of one convolution may overlap the trailing half of the preceding convolution as shown in FIG. 8 to form tubing having triple thickness walls.

When double-ply material is used (for example laminations of different papers, or foil on paper, or plastic sheeting on paper, or any combinations of laminations of sheet materials) to make tubing with double thickness walls as in FIG. 9, the overlap of leading and trailing edges of one layer are preferably staggered with respect to or inbetween the edges of the other layer.

Also, it is possible, as shown in FIG. 10, to lay an insert of different material inbetween the overlapped trailing and leading edges where the inserted layer will be invisible in the finished tubing.

When two strips of equal width, but of different materials are used to form four-thickness walls as in FIG. 11, one material will show inside and the other will show outside, each to the exclusion of the other.

The foregoing are only some examples of single and multi-ply multiple wall constructions that can be made under the invention from a laminated strip and a single-ply strip, or from two laminated strips, or from two or more single-ply strips. These, when used as above suggested, will produce tubing having a single-thickness wall, a double-thickness wall or any multiple thicnkess wall structure.

Figure 12:
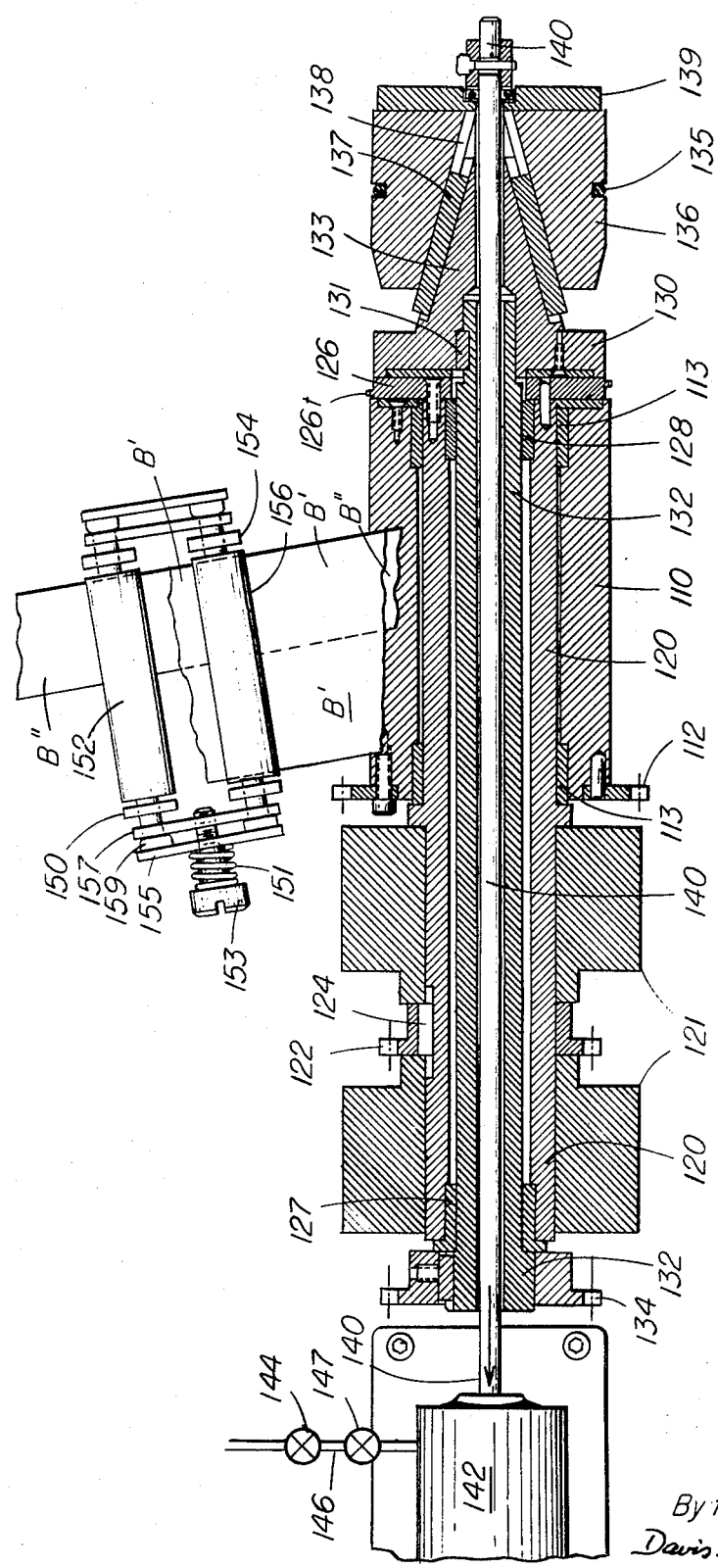
FIG. 12 is a longitudinal section view similar to FIG. 2 of a slightly modified form of the invention.

Refering now to FIG. 12 wherein a modification of the tube generating parts is illustrated, similar reference numerals are used (but from 100 upward) for parts which are equivalent in FIGS. 1–6. Thus 110 is equivalent to 10.

The following are similarly positioned and similarly operated in FIG. 12 as in FIGS. 1–5. The guide mandrel 110, when driven, is driven by sprocket 112 secured thereto and is mounted on hollow shaft 120, passing therethrough by bearings 113. The hollow shaft 120 carries at one end the forming ring 126 to which it is secured by screw bolts and pins. The forming ring has a thread 126t as in the FIG. 2 form. The shaft 120 rotates in bearings 121 as before and is driven by sprocket 122 which is keyed to it by key 124.

Passing axially through hollow shaft 120 is a compression mandrel drive-shaft 132 supported by bearings 127, 128 at opposite ends. The shaft 132 is driven by sprocket 134 to which it is keyed.

In FIG. 12, the compression mandrel 130 is keyed to compression mandrel drive-shaft 132 by key 131 and is of different form than in FIG. 2. The exit end of the compression mandrel 130 is tapered from a reduced diameter, and formed as a frustum of a pyramid, as at 133. On this portion 133 are slidably mounted several complementary arcuate segments 136 (preferably three or four) for movement lengthwise on the pyramidal portion 133. They are pressed radially against the pyramidal portion by a circumferential coil spring 135 located in circumferential recesses in peripheries of the arcuate segments. Lengthwise extending keys 137 on the pyramidal portion 133 fit in complementary keyways 138 on the interior surfaces of the segments 136 and guide the movement of the segments as well as preventing their sliding across the pyramidal portion 133.

To move the segments lengthwise, a pneumatically actuated rod 140 passes axially through the compression-mandrel-drive shaft 132 which in this case is hollow instead of solid as in FIG. 2. Held on the exit end of the rod 140 is an annular disc or collar 139 which abuts the end faces of the segments 136 so that as the rod 140 is drawn into the mandrel-drive shaft 132, the segments slide up the pyramidal surface of the compression mandrel and move radially outward as they move lengthwise up the mandrel. In reverse, the spring 135 moves the segments radially inward as they move lengthwise.

In order to control the movement of the rod 140, a compressed air cylinder 142 actuates a piston (not shown) on the end of rod 140, in the direction of the arrow in FIG. 12.

Air pressure to the cylinder 142 is controlled by a valve 144 in an air supply pipe 146 so that the segments can be drawn to any position desired along the pyramidal end of the compression mandrel. In that way, the amount of frictional drag of the segments on the formed tubing can be controlled. A bleeder valve 147 is inserted in the air line 146 so that the pressure in the air cylinder can be reduced to remove all pressure on the rod 140.

To control the tension on the strip or strips as they are drawn to and through the machine, adjustable tensioning rolls may be provided. The tensioning means illustrated is exemplative and diagrammatic and is not claimed, per se, as an invention. It may comprise parallel vertical standards 150 for a horizontal lower pair of rolls 152 and similar parallel standards 154 for an upper pair of rolls 156 (only the top rolls of the pairs being visible in FIG. 12). A strip B' passes between rolls 156 and a strip B" passes between rolls 152.

Tension of a coiled compression spring 151 may be adjusted by a thumb-screw 153 which penetrates the spring and passes loosely through a plate 155 and threads into a plate 157. The plates 155, 157 are loosely mounted on and bridge the shafts of the top rollers of the pairs 152 and 156. A disc or collar 159 is secured on and turns with the top roller shafts between the plates 155, 157 so that when the thumb screw is tightened or loosened, the brake disc is clamped more or less, thereby adjusting the frictional drag and the tension on the strips B' and B" which pass over the guide roll 110 into the machine.

From the foregoing, it will be seen that the arrangement in FIG. 12 provides manual adjustment of the tension of the strips B', B". Also manual adjustment, through the air cylinder of the compression mandrel, is provided so that the convolutions of the formed tubing may be compressed more or less by increasing or decreasing the frictional drag of the segments of the compression mandrel upon the interior of the tubing.

The showing of a wide and a narrow strip in FIG. 12 is merely exemplative. Strips of the same or different widths in the upper or lower locations can be used in FIG. 12 as well as in the forms of FIGS. 1–5. And, the tubing described in FIGS. 6–11 can be made on the FIG. 12 form in all respects as on the FIGS. 1–5 form.

From the foregoing, it is obvious that tubing with composite walls of many types and thicknesses (double wall or other plural wall) is possible within the scope of the invention by using the same or various different kinds of strip material of different or the same width and different degrees of lead along the guide mandrel.

In all the described forms and alternative modifications, the helical ribbing of the tubing locks together the successive convolutions of the wound strip or strips of material so that an integral continuous duct is formed which can be cut into any lengths desired. If desired, the overlapping edges of the strips PS' or PS" may be glued together by any suitable adhesive with conventional devices for applying adhesive as are well known in the tube winding art. Likewise, the overlapping strips B', B", PS" and LS may be glued together throughout their width or only at their edges by conventional devices for applying adhesives along the selected paths.

The invention is not limited to paper nor to a particular thickness and width of strip. As strip material, synthetic plastics such as polyethylene or polyvinyl chloride or other plastic materials in the form of thin films can be used, alone or laminated on another strip. Various types and kinds of paper from smooth surface kraft paper to rough surface paper like paper toweling may be used as well as aluminum or other thin metal foils, so long as the material used is capable of being formed into the desired shape as described, and is capable of retaining such shape and form.

Many variations are possible within the scope of the invention in the construction and operation of the machine and also in the practicing of the method. Each variable can affect the resulting product and some produce products that differ in kind.

In the machine there are the following variables:

(a) the number of thread-like ridges on the forming ring (single, double or multiple).

(b) The pitch and lead of the threads on the forming ring.

(c) The peripheral speed of the forming ring.

(d) The direction of rotation of the forming ring (including none, although none is not practical).

(e) The rotation or stationary condition of the guide mandrel.

(f) The freely rotating or driven condition or absence of the compression mandrel.

In the method, there are the following variables respecting the materials acted upon, in addition to some of the machine variations above mentioned which alter the method and affect the resulting product:

(a) The width of the strip material.

(b) The number of strips.

(c) The width of each of plural strips relative to each other.

(d) The location of the edges of plural strips relative to each other.

In view of the foregoing, it is apparent that many modifications within the scope of the invention with respect to the tubing, the method of making it and the machine for making it will occur to those skilled in the art. Therefore, the invention is not limited to the specific embodiments illustrated and described.

What is claimed is:

1. A machine for generating helically wound tubing from strip material with helical ribbing, comprising stationary strip-material supply means, means to guide strip material as it is wound helically with the trailing edge of one convolution of the strip overlapped by the leading edge of the next succeeding convolution of the strip, and rotatable ridge forming means to exert internal pressure on the wound strip to generate an external helical ridge in the wound strip and cause interlocking of the adjacent convolutions of the overlapped convolutions of the strip and form unitary tubing, and means to rotate said ridge forming means at a different peripheral speed than the speed of movement of said strip material, and means movable with a combined radial and axial motion engaging the interior of said tubing to retard the movement thereof off the machine, and manually controllable means exterior of the tubing to cause movement of said retarding means to increase or decrease the amount of retardation.

2. A machine as claimed in claim 1 wherein the manually controllable means includes a pneumatic cylinder and piston and a manually operable control valve to govern the position of said piston and of said retarding means.

3. A machine as claimed in claim 1 wherein the retarding means is means coaxial with and movable axially with respect to said ridge forming means and said manually controllable means regulate the axial movement of said coaxial means and govern the amount of retardation of said retarding means.

4. A machine as claimed in claim 1 wherein the retarding means includes rotary means over which the ridged tubing passes from said ridge forming means, tapered means on said rotary means, a plurality of segments slidable on said tapered means having combined radial and axial motion as they slide for engaging the interior of the tubing to impart different degrees of frictional drag to retard and vary the movement of the tubing.

References Cited

UNITED STATES PATENTS

| 2,002,896 | 5/1935 | Kopetz | 93—80 |
| 2,001,896 | 5/1935 | Kopetz | 93—80 |
| 2,935,003 | 5/1960 | Harris | 93—80 |

FOREIGN PATENTS

| 529,484 | 8/1956 | Canada. |
| 536,602 | 1/1957 | Canada. |

CHARLES W. LANHAM, Primary Examiner

A. L. HAVIS, Assistant Examiner

U.S. Cl. X.R.

72—49